Oct. 19, 1954 M. R. CINES 2,692,227
AZEOTROPIC DISTILLATION OF STRAIGHT CHAIN PARAFFINS
FROM MIXTURES WITH BRANCHED CHAIN PARAFFINS
WITH PERFLUORO COMPOUNDS
Filed Dec. 20, 1950
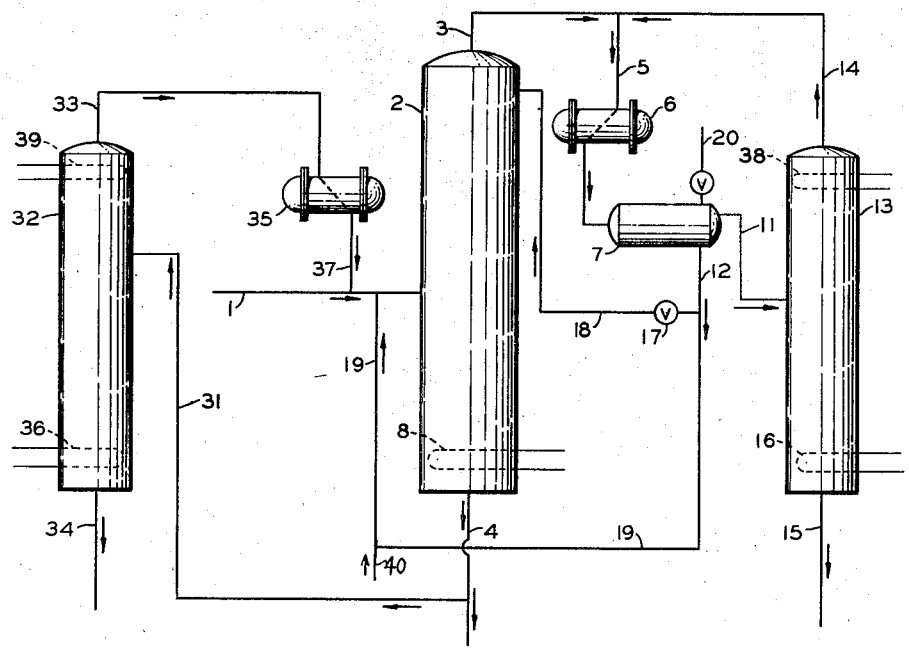
INVENTOR.
M. R. CINES
BY
ATTORNEYS Patented Oct. 19, 1954

2,692,227

UNITED STATES PATENT OFFICE 2,692,227

AZEOTROPIC DISTILLATION OF STRAIGHT CHAIN PARAFFINS FROM MIXTURES WITH BRANCHED CHAIN PARAFFINS WITH PERFLUORO COMPOUNDS

Martin R. Cines, Bartlesville, Okla., assignor to Phillips Petroleum Company, a corporation of Delaware Application December 20, 1950, Serial No. 201,842

12 Claims. (Cl. 202—42)

This invention relates to the separation of straight-chain paraffin hydrocarbons from mixtures with branched-chain paraffin hydrocarbons. In one aspect it relates to a method for the separation of straight-chain paraffins from mixtures with branched-chain paraffins by means of azeotropic distillation. In another of its aspects, it relates to a method for the azeotropic distillation of straight-chain hydrocarbons from branched-chain hydrocarbons with the use of nonacidic organic perfluoro compounds as entrainers.

The separation of normal paraffins from branched-chain paraffins is highly desirable in many instances in the petroleum and chemical industries. In the manufacture of pure hydrocarbons, isolation of a single isomer in pure form is necessary, though this is quite difficult to accomplish in many mixtures available for processing. In another instance, it may be desired to remove normal paraffins from fuels for spark ignition engines, especially those for aviation and other high compression engines, in order to obtain fuels of high octane number.

In many instances, the separation of the normal from isoparaffins is not practical by ordinary distillation due to the closeness of the boiling points of many of these compounds. This is especially true of the paraffins of seven carbon atoms per molecule and higher. For example, normal heptane boils at 209.2° F. and 2,2,4-trimethylpentane boils at 210.6° F. Because of the closeness of boiling points and consequently very slight difference is volatility, these two components are quite difficult to separate by ordinary fractional distillation. My process is applicable to the separation of straight chain olefins from branched chain olefins as well as to the separation of straight chain paraffins from branched chain paraffin hydrocarbons.

I have now found a new class of entrainers with which close-boiling normal and isoparaffins can be separated by azeotropic distillation. This class of entrainers is made up of those non-acidic organic perfluoro compounds boiling within 70 degrees Fahrenheit of the normal paraffin to be separated and which have preferential solubility for the isoparaffins. It is preferred that the perfluoro compound have a boiling point within 35 degrees Fahrenheit of the normal paraffin.

The difficulty of separating the $C_7$ and higher normal paraffins from close boiling branched chain paraffins is usually greater than in the case of the lower molecular weight normal paraffins, for in these higher molecular weight ranges at least one and sometimes more than one of the many isomeric paraffins boils very close to the normal hydrocarbon which it is desired to remove. Thus, the process of this invention finds its greatest application in separation of $C_7$ and higher normal paraffins, but may be used with lower boiling normal paraffins.

By "perfluoro compounds" I mean completely fluorinated non-acidic organic compounds. These compounds may be fluorocarbons, that is, compounds containing only fluorine and carbon, or such other compounds as ethers, amines, and the like, wherein all of the hydrogen atoms bonded directly to carbon atoms in the original organic compounds have been replaced by fluorine atoms. Types of suitable non-acidic perfluoro compounds which may be used include perfluoro paraffins, perfluoro dialkyl ethers, perfluoro trialkylamines, perfluorocycloparaffins, perfluoro alkylcycloparaffins, and others.

My process is particularly adapted to the separation of close boiling hydrocarbons such as the separation of a straight chain paraffin hydrocarbon from admixture with at least one branched chain paraffin hydrocarbon from a narrow boiling range fraction, such as is frequently available in refineries or chemical plants. By close boiling compounds or narrow boiling range fractions is meant a temperature spread of, for example, up to 25° F. between the highest boiling and the lowest boiling constituents of the fraction.

One object of my invention is to provide a method for the separation of straight chain paraffinic hydrocarbons from branched chain paraffinic hydrocarbons.

Another object of my invention is to provide a process for the separation of a straight chain paraffinic hydrocarbon from a close boiling branched chain paraffinic hydrocarbon.

Yet another object of my invention is to provide a process for the separation and isolation of one or more straight chain paraffinic hydrocarbons from a mixture with branched chain paraffinic hydrocarbons, all of the hydrocarbons boiling within a narrow temperature range.

Still other objects and advantages of my process will be realized upon reading the following disclosure which, taken with the attached drawing, forms a part of this specification.

The drawing represents, diagrammatically, one arrangement of apparatus parts in which to carry out the process of my invention.

I have discovered a new class of vapor entrainers which exhibit most unusual and unexpected properties. These entrainers are the perfluoro or completely fluorinated organic compounds. These entrainers possess the property of forming so-called constant boiling mixtures of the minimum boiling point type with straight chain and with branched chain paraffinic compounds. These entrainers are found to be selective for the straight chain paraffinic hydrocarbons in preference to the branched chain paraffinic hydrocarbons. As hereinbefore stated, n-heptane boils at 209.2° F. and 2,2,4-trimethylpentane boils at 210.6° F. and in the presence of perfluoro di-n-butyl ether as an entrainer the n-heptane is easily removed from the trimethylpentane in the overhead product from a distillation operation. Many other examples of specific applications of the process of my invention could be given.

Referring now to the drawing, reference numeral 2 refers to a distillation column or still which, when used in azeotropic distillation, is frequently termed an "azeo" column. This fractionating tower or azeo column may be a more or less conventional bubble cap tower, packed tower or the like. A reboiler coil 8 is positioned in the kettle section for addition of reboiling heat. Column 13 is likewise an azeotropic distillation column but, as will be subsequently described, this column may be a smaller column, that is, one having a smaller capacity than the main column 2. A third distillation column 32 is provided for use under special conditions. The columns 13 and 32 may be provided with bubble cap tray assemblies or any desired type of packing suitable for use in the separation steps carried out in these columns. Reboiler coils 16 and 36 are provided in columns 13 and 32, respectively, for furnishing heat for the distillation operations. Units 6 and 35 are condensers. These condensers are preferafly water cooled condensers and are intended to condense completely the vaporous products passing through their respective vapor inlet lines. Vessel 7 is merely a phase separation tank in which two immiscible liquid phases are permitted to separate by gravity.

As an example of the operation of this apparatus for carrying out the process of my invention, a narrow boiling cut of isooctane (2,2,4-trimethylpentane) and n-heptane is introduced into fractionator 2 through line 1 from a source, not shown. The vapor entrainer, in this example, perfluoro-di-n-butyl ether, from a source to be disclosed subsequently, is passed through line 19 into the feed line 1 so that a mixture of two liquids, the feed stock and the entrainer, are introduced into the fractionator 2 at about a midpoint. A sufficiently high temperature is maintained in the kettle section of this column through the reboiler coil 8 to distill overhead an azeotropic mixture of the n-heptane and entrainer at a temperature below the boiling temperature of the n-heptane and isooctane hydrocarbons. Whether or not the isooctane forms an azeotrope with the entrainer is immaterial. In this particular example, if the isooctane forms an azeotrope with the entrainer, its volatility is such that it remains as still bottoms and the n - heptane - perfluoro - di - n - butylether azeotrope passes overhead as column overhead product. This vaporous overhead product is passed through lines 3 and 5 into condenser 6 in which complete condensation of the vapor occurs. The liquid condensate then flows on into the separator or accumulator tank 7 in which liquid n-heptane and the liquid entrainer separate as two liquid phases. The perfluoro compound settles to the bottom since it is specifically heavier than the n-heptane. In the n-heptane layer, there is dissolved a small quantity of perfluoro compound, while a small quantity of n-heptane remains dissolved in the perfluoro compound layer.

The lower or perfluoro compound layer is removed from separator 7 through a pipe 12. To reflux the main azeotrope column 2, a portion of the perfluoro compound layer passing through line 12 may be by-passed through line 18 containing valve 17 and added into the azeo column at the proper refluxing point. The main portion of this perfluoro compound layer containing, as mentioned, a small amount of dissolved n-heptane passes from line 12 through line 19 to be added to the original feed stock to the azeo column 2. This portion of the entrainer is the portion referred to above as originating at a source to be described.

If desired, a closed reflux coil, not shown, may be inserted in the top portion of the column 2.

The n-heptane layer containing some dissolved perfluoro compound is removed from the accumulator 7 through line 11 and is introduced into the distillation column 13. Heat for distillation is added to this column from the reboiler coil 16 while refluxing may be effected by passing a coolant through reflux coil 38. This column is so operated that the small amount of dissolved perfluoro compound is vaporized with a corresponding amount of n-heptane as azeotrope and this vaporous material is passed through line 14 and line 5 into condenser 6. This azeotrope vapor passing from column 13 through line 14 has the same composition as the azeotropic vapor passing through line 3 when columns 13 and 2 are operated under the same pressure. Since these two vapor streams possess the same or substantially the same composition, the vapor streams are combined in line 5 and the combined stream condensed in condenser 6 and the condensate passed into the separator 7 for separation of the liquid phases, as discussed above. Line 20 is provided with a pressure release valve in case release of pressure from tank 7 is necessary. Makeup perfluoro compound as needed may be added to the system through line 40.

Since the amount of perfluoro compound contained in the n-heptane layer in tank 7 is usually small, the amount of azeotrope vapor passing through line 14 is, likewise, small. It is intended that all of the perfluoro compound be distilled overhead in this perfluoro compound recovery column 13. By removing all of the perfluoro compound overhead it leaves a pure n-heptane product in the kettle and this material is removed from the kettle through line 15 as one of the products of the process. This heptane may be passed to a storage tank or subsequent disposal, as desired, and not shown.

In the operation of the main azeotrope column 2, it is intended that approximately the exact amount of perfluoro entrainer be added with the charge stock to vaporize the entire n-heptane content of the feed stock. If an excess of entrainer is added at this point, the excess over that required to form the azeotrope with n-heptane will accumulate in the still bottoms and will be removed with the bottoms through line 4. When the amount of entrainer carried in the still bottoms warrants recovery, a still 32 with its auxiliary equipment is required.

As mentioned before, the preferred method of operation is to add the required amount of entrainer with the feed stock. However, the addition of the exact amount of entrainer is difficult to realize under conditions of normal plant operation. A determining factor as to whether an excess or a deficiency of entrainer is added to the feed stock is the product or products to be produced. If the isooctane, for example, is to be a pure compound or to be used for octane rating purposes, all of the n-heptane should of course be removed. It might be better to loose a slight amount of isooctane overhead than to contaminate the isooctane with some n-heptane, which as is well known, has an octane number of zero. When producing an isooctane product of commercial or technical grade, this product may then be permitted to contain some n-heptane and yet meet commercial or technical grade specifications.

However, in those cases when an excess of entrainer is used in the main azeo column 2, and this excess entrainer is permitted to remain in the azeo still bottoms, the isooctane bottoms containing this excess entrainer is passed through lines 4 and 31 and introduced into the distillation column 32 as shown. Distillation column 32 is operated in such a manner that an azeotropic mixture of isooctane and entrainer is removed through the overhead vapor line 33. This vapor is condensed in condenser 35 and the condensate passed through line 37 and introduced into the main azeotrope column 2 with the feed stock and main quantity of entrainer from line 19. This condensate may be added to the plant feed stock since its amount will ordinarily be small. The excess isooctane over that required to form the azeotrope in column 32 will then accumulate in this column as still bottoms and will be removed through line 34 and passed to storage, not shown, or to subsequent use as desired. Column 32 is provided with a closed reflux coil 39.

The particular pressures carried in columns 2 and 13 are not critical, and I prefer to use pressures from atmospheric up to about 50 pounds per square inch gage. Some pressure greater than atmospheric is ordinarily required to cause flow of products or materials from one stage of the process to the next. One disadvantage of using higher pressures in the stills 2 and 13 is that higher reboiler temperatures are required to effect the distillation steps.

The above description is intended to be illustrative for the separation of two close boiling compounds according to the process of my invention. When separating a straight chain aliphatic hydrocarbon from a close boiling fraction containing a plurality of aliphatic hydrocarbons, substantially the same procedure is practiced. For example, if a fraction of a hydrocarbon boiling within a temperature range up to 25° F. and containing a straight-chain paraffinic compound and one or more branched chain paraffinic compounds, the straight chain compound will be removed from the system through the bottoms drawoff line 15 from still 13 while the branched chain paraffinic hydrocarbons will be removed through the bottoms drawoff line 4 from still 2. In a separation of this type, the use of a deficiency, an excess or the exactly correct amount of entrainer may be determined by the separation to be made, and/or by the products desired.

Whether operating to separate one compound from another or one or more compounds from a fraction containing a plurality of compounds, the entrainer should have a boiling point within at least 70° F. of the boiling point of the hydrocarbons to be taken overhead as azeotrope. This 70° F. temperature difference may be 70° below or 70° above the boiling point of the straight chain paraffinic hydrocarbons. It is preferred, however, to use an azeotrope former boiling within about 35° F., above or below, the boiling point of the hydrocarbon to be taken overhead from the azeo column 2.

*Example I*

In a packed column equivalent to about 5 theoretical plates, a mixture of normal heptane and isooctane was distilled in the presence of perfluoro-di-n-butyl ether (B. P. 212° F.) as the entrainer. The initial amount of entrainer amounted to about 25 per cent of the volume of the total hydrocarbon charged. The distillation was carried out at a 5/1 reflux ratio until the entire amount of entrainer had been carried overhead. At this time, about 20 volume per cent of the initial hydrocarbon charge had been recovered as overhead product. The analyses of the charge, overhead product and kettle product follow, these analyses being volume per cent on an entrainer-free basis.

| | Charge | Overhead Product | Kettle Product |
|---|---|---|---|
| Normal heptane | 25 | 38 | 22 |
| Isooctane | 75 | 62 | 78 |

*Example II*

As an example of the utility of the process of my invention for separating a straight chain paraffinic hydrocarbon from a fraction containing a plurality of hydrocarbons, specifically a hydrofluoric acid alkylate, are the following data:

In a 13 mm. diameter Hypercal column 3 feet high, a mixture of normal nonane (B. P. 303.4° F.) and a fraction of paraffinic alkylate boiling in the range of 294° F. to 310° F. was distilled in the presence of perfluoro-tri-n-butylamine (B. P. 351° F.). The entrainer in the column charge was 40 per cent of the volume of the hydrocarbon charged. The hydrocarbon (entrainer-free basis) was 29 volume per cent n-nonane. Approximately one-fourth of the hydrocarbon was distilled overhead, and the entrainer-free overhead hydrocarbon was found to contain 63 volume per cent n-nonane.

Valves, pumps, pressure and temperature recording and control apparatus, level controllers and such auxiliary apparatus is not shown in the drawing nor described in this specification for purposes of simplicity. Those skilled in the art understand the necessity for the use of such auxiliary equipment.

The above described flow diagram is given for illustrative purposes and should not be regarded as limiting the invention, the scope of which is set forth in the following claims.

I claim:

1. In the refining of hydrocarbons the improvement comprising subjecting a narrow boiling range mixture of hydrocarbons comprising a straight chain paraffinic hydrocarbon and a branched chain paraffinic hydrocarbon to distillation in the presence of a completely fluorinated organic compound selected from the group of compounds consisting of perfluoro-paraffins, perfluoro-di-alkyl ethers, perfluoro-tri-alkyl amines, perfluoro-cycloparaffins and perfluoro-alkyl-cycloparaffins, said fluorinated compound boiling within 70° F. of said straight chain paraffinic hydrocarbon, recovering the straight chain paraffinic compound from the distillate and recovering the branched chain paraffinic compound from the still bottoms.

2. The method for separating normal heptane from admixture with 2,2,4-trimethylpentane comprising subjecting this admixture of hydrocarbons to distillation conditions in the presence of perfluoro-di-n-butyl ether, recovering the normal heptane from the distillate and recovering the 2,2,4-trimethylpentane from the still bottoms.

3. The method for separating normal nonane from admixture with a fraction of paraffinic hydrocarbons boiling from 294° to 310° F. comprising distilling this admixture in the presence of perfluoro-tri-n-butyl amine, recovering normal nonane from the distillate as one product of the process and recovering the remaining paraffinic hydrocarbons from the still bottoms.

4. In the refining of hydrocarbons the improvement comprising subjecting a narrow boiling range fraction of hydrocarbons comprising straight chain paraffinic hydrocarbons and branched chain paraffinic hydrocarbons to distillation conditions in the presence of a completely fluorinated organic compound boiling within 70° F. of the straight chain paraffinic hydrocarbons and selected from the group of compounds consisting of perfluoro-paraffins, perfluoro-di-alkyl-ethers, perfluoro-tri-alkyl amines, perfluoro-cycloparaffins and perfluoro-alkyl-cycloparaffins, as an entrainer, condensing the overhead vapors, separating the condensate into a hydrocarbon phase rich in straight chain paraffinic hydrocarbon and containing some of said completely fluorinated organic compound in solution and a completely fluorinated organic compound phase containing some straight chain paraffinic hydrocarbon in solution, recycling this latter fluorinated organic compound phase containing some straight chain paraffinic hydrocarbon into the original distillation operation as said completely fluorinated organic compound, subjecting the separated hydrocarbon phase rich in straight chain paraffinic hydrocarbon and containing some of said completely fluorinated organic compound in solution to distillation conditions, condensing the overhead vapors from this latter distillation operation and adding the condensate to the condensate of the first mentioned distillation operation, removing still bottoms from this second distillation operation as one product of the process and removing the still bottoms from the first mentioned distillation operation as a second product of the process.

5. In the method of claim 4, dividing the completely fluorinated organic compound phase containing some straight chain paraffinic hydrocarbon in solution into two portions, introducing one portion as reflux into the first distillation operation and recycling the other portion into the first distillation operation as said entrainer.

6. In the refining of hydrocarbons the improvement comprising subjecting a narrow boiling range mixture comprising a straight chain hydrocarbon and a branched chain hydrocarbon to distillation in the presence of an organic perfluoro compound having a normal boiling point within 70° F. of the normal boiling point of the straight chain hydrocarbon and selected from the group of entrainers consisting of perfluoro-paraffins, perfluoro-di-alkyl ethers, perfluoro-tri-alkyl amines, perfluoro-cycloparaffins and perfluoro-alkyl-cycloparaffins, recovering the straight chain hydrocarbon from the distillate and recovering the branched chain hydrocarbon from the still bottoms.

7. In the refining of hydrocarbons the improvement comprising subjecting a narrow boiling range mixture comprising a straight chain olefin hydrocarbon and a branched chain olefin hydrocarbon to distillation in the presence of an organic perfluoro compound having a normal boiling point within 70° F. of the normal boiling point of the straight chain olefin hydrocarbon and selected from the group of entrainers consisting of perfluoro-paraffins, perfluoro-di-alkyl ethers, perfluoro-tri-alkyl amines, perfluoro-cycloparaffins and perfluoro-alkyl-cycloparaffins, recovering the straight chain olefin hydrocarbon from the distillate and recovering the branched chain olefin hydrocarbon from the still bottoms.

8. The method for separating normal heptane from admixture with a close boiling branched chain paraffinic hydrocarbon comprising subjecting the admixture of hydrocarbons to distillation conditions in the presence of a completely fluorinated organic compound boiling within 70° F. of the boiling point of n-heptane and selected from the group of compounds consisting of perfluoro-paraffins, perfluoro-di-alkylethers, perfluoro-tri-alkyl amines, perfluoro-cycloparaffins and perfluoro-alkyl-cycloparaffins, as an entrainer, condensing the overhead vapors, separating the condensate into a hydrocarbon phase rich in n-heptane and containing some of said completely fluorinated organic compound in solution and a completely fluorinated organic compound phase containing some n-heptane in solution, recycling this latter fluorinated organic compound phase containing some n-heptane into the original distillation operation as said completely fluorinated organic compound, subjecting the separated hydrocarbon phase rich in n-heptane and containing some of said completely fluorinated organic compound in solution to distillation conditions, condensing the overhead vapors from this latter distillation operation and adding the condensate to the condensate of the first mentioned distillation operation, removing still bottoms from this second distillation operation as one product of the process and removing the still bottoms from the first mentioned distillation operation as a second product of the process.

9. The method for separating n-nonane from admixture with a close boiling branched chain paraffinic hydrocarbon comprising subjecting the admixture of hydrocarbons to distillation conditions in the presence of a completely fluorinated organic compound boiling within 70° F. of the boiling point of n-nonane and selected from the group of compounds consisting of perfluoro-paraffins, perfluoro-di-alkylethers, perfluoro-tri-alkyl amines, perfluoro-cycloparaffins and perfluoro-alkyl-cycloparaffins, as an entrainer, condensing the overhead vapors, separating the condensate into a hydrocarbon phase rich in n-nonane and containing some of said completely fluorinated organic compound in solution and a completely fluorinated organic compound phase containing some n-nonane in solution, recycling this latter fluorinated organic compound phase containing some n-nonane into the original distillation operation as said completely fluorinated organic compound, subjecting the separated hydrocarbon phase rich in n-nonane and containing some of said completely fluorinated organic compound in solution to distillation conditions, condensing the overhead vapors from this latter distillation operation and adding the condensate to the condensate of the first mentioned distillation operation, removing still bottoms from this second distillation operation as one product of the process and removing the still bottoms from the first mentioned distillation operation as a second product of the process.

10. The method for separating a straight chain olefin hydrocarbon from admixture with a close boiling branched chain olefin hydrocarbon comprising subjecting the admixture of hydrocarbons to distillation conditions in the presence of a completely fluorinated organic compound boiling within 70° F. of the boiling point of the straight chain olefin hydrocarbon and selected from the group of compounds consisting of perfluoro-paraffins, perfluoro-di-alkylethers, perfluoro-tri-alkyl amines, perfluoro-cycloparaffins and per-fluoro-alkyl-cycloparaffins, as an entrainer, condensing the overhead vapors, separating the condensate into a hydrocarbon phase rich in the straight chain olefin hydrocarbon and containing some of said completely fluorinated organic compound in solution and a completely fluorinated organic compound phase containing some of said straight chain olefin hydrocarbon in solution, recycling this latter fluorinated organic compound phase containing some of said straight chain olefin hydrocarbon into the original distillation operation as said completely fluorinated organic compound, subjecting the separated hydrocarbon phase rich in the straight chain olefin hydrocarbon and containing some of said completely fluorinated organic compound in solution to distillation conditions, condensing the overhead vapors from this latter distillation operation and adding the condensate to the condensate of the first mentioned distillation operation, removing still bottoms from this second distillation operation as one product of the process and removing the still bottoms from the first mentioned distillation operation as a second product of the process.

11. The separation of normal heptane from a narrow boiling range mixture of hydrocarbons comprising normal heptane and 2,2,4-trimethylpentane by admixing therewith perfluoro-di-n-butyl ether and subjecting the admixture thus obtained to distillation.

12. In the refining of hydrocarbons the improvement comprising subjecting a narrow boiling range mixture comprising a less highly branched chain hydrocarbon and a more highly branched chain hydrocarbon to distillation in the presence of an organic perfluoro compound having a normal boiling point within 70° F. of the normal boiling point of the less highly branched chain hydrocarbon and selected from the group of entrainers consisting of perfluoro-paraffins, perfluoro-di-alkyl ethers, perfluoro-tri-alkyl amines, perfluoro-cycloparaffins and perfluoro-alkyl-cycloparaffins, recovering said less highly branched chain hydrocarbons from the distillate and recovering the more highly branched chain hydrocarbon from the still bottoms.

References Cited in the file of this patent

UNITED STATES PATENTS

| Number | Name | Date |
|---|---|---|
| 1,919,752 | Schmidt et al. | July 25, 1933 |
| 2,207,608 | Britton et al. | July 9, 1940 |
| 2,290,636 | Deanesly | July 21, 1942 |
| 2,372,941 | Evans et al. | Apr. 3, 1945 |
| 2,408,922 | Evans et al. | Oct. 8, 1946 |
| 2,426,821 | Evans et al. | Sept. 2, 1947 |
| 2,442,589 | Evans et al. | June 1, 1948 |